2,850,992
GARDEN WATERING TOOL

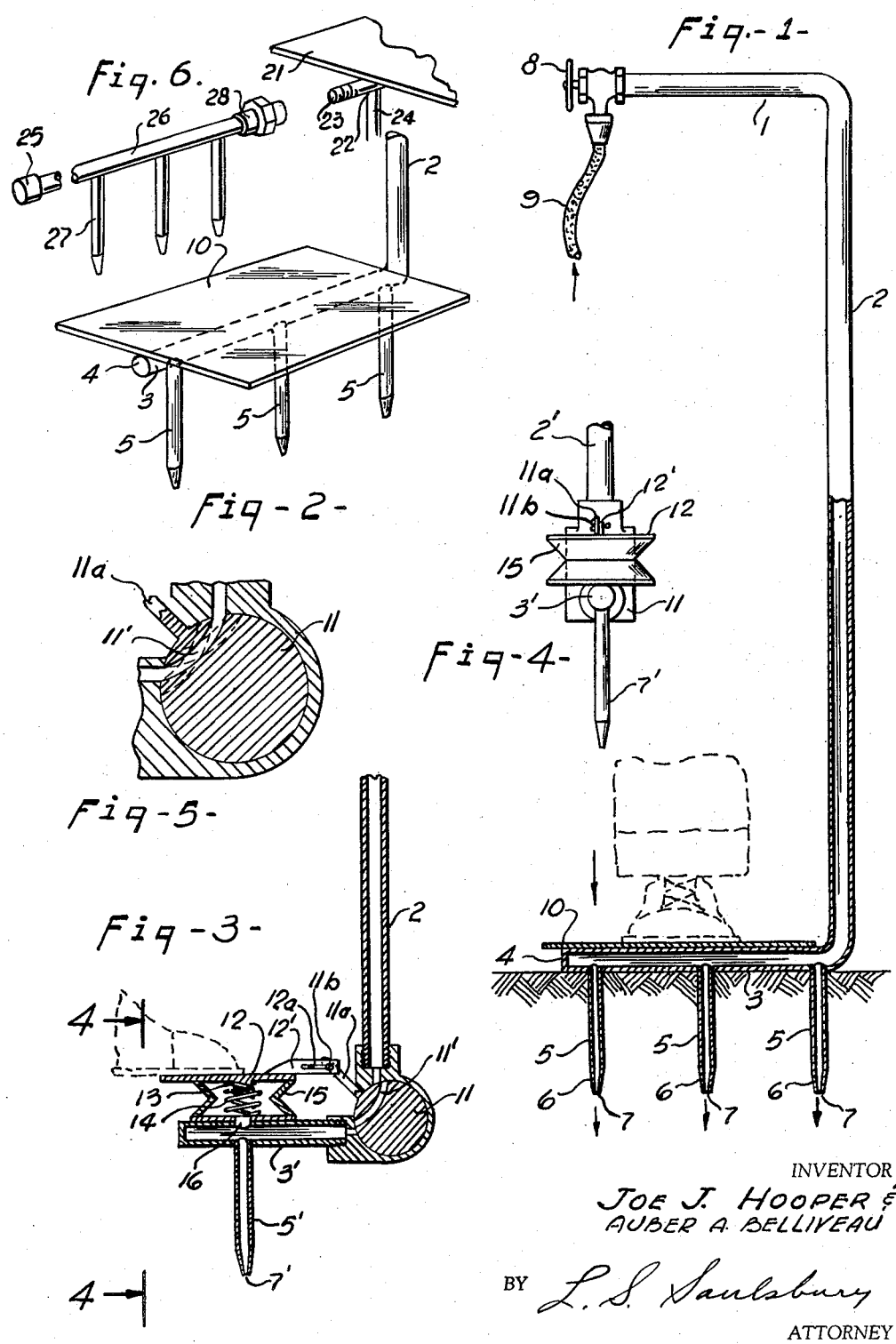

Joe John Hooper, South San Francisco, Calif., and Auber A. Belliveau, Astoria, N. Y.; said Belliveau assignor to said Hooper Application November 24, 1954, Serial No. 470,980

2 Claims. (Cl. 111—7.1)

This invention relates to gardening tools and more particularly to a soil loosening and watering tool.

It is an object of the invention to provide a tool for loosening the soil and applying liquid directly into the ground adjacent to the roots of grass, plants, shrubs and the like.

It is another object of the invention to provide a soil loosening and watering tool which directs the flow of liquid in such a manner as to facilitate the soil loosening operation.

It is still another object of the invention to provide a soil loosening and watering tool with means for applying a powerful temporary stream of liquid to overcome resistance to flow either within or without the tool.

It is a further object of the invention to provide a soil loosening and watering tool with a foot operated liquid supply valve which provides complete and instant control of the flow of liquid while leaving the user's hands free.

It is a further object of the invention to provide a soil loosening and watering tool which is simple in structure and is light enough to serve as a hand tool.

For a better understanding of the invention, reference may be had to the following detailed description taken in connection with the accompanying drawing, in which:

Figure 1 is a side elevational view, partly in section, of the soil loosening and watering tool with the prongs forced into the soil under the pressure of the user's foot;

Fig. 2 is a fragmentary perspective view showing the prongs and the foot rest;

Fig. 3 is a fragmentary sectional view in elevation, showing an improved type of water flow control means;

Fig. 4 is a fragmentary end elevational view of the form of the invention shown in Fig. 3 as viewed from line 4—4 thereof;

Fig. 5 is an enlarged fragmentary sectional view similar to Fig. 3 of the rotary valve in its open position;

Fig. 6 is a fragmentary perspective view of a modified form of the invention showing the watering tool and an extension therefor.

The present soil loosening and watering tool is provided with a bent pipe handle which consists of an upper horizontal pipe portion 1, and a vertical pipe portion 2, which is in turn connected with a lower horizontal pipe portion 3 closed at one end 4. A plurality of tubular prongs 5 are connected with the lower horizontal pipe portion 3 and depend downwardly from it. The tubular prongs 5 are provided with pointed ends 6 and openings 7 from which the water is dispensed.

The open end of the upper horizontal pipe portion 1 has a hand valve 8 which is connected with any water supply source by a hose 9. It may be seen that water from hose 9 will pass through valve 8, the connected pipe portions 1, 2 and 3, prongs 5 and into the soil through openings 7. A foot plate 10 is attached to the top of the lower pipe portion 3, as shown.

The tool is operated by forcing the prongs 5 into the soil by the pressure of the user's foot applied to the foot plate 10. If the flow of water is started as soon as the points 6 have penetrated into the soil, the downwardly directed streams of water will tend to soften the earth and will thus facilitate the further penetration of the prongs.

A modification of the soil loosening and watering tool is shown in Figs. 3, 4 and 5. This modification is provided with a valve 11 which has one open and two closed positions. This valve 11 is placed in the liquid supply line to connect pipe portion 2' with pipe portion 3' and is actuated by the movement of a foot plate 12 in a manner as will be described in detail. The valve 11 has a curved passage 11' and an operating arm 11a that is pivotally connected by a pin 11b to an arm 12' on plate 12. The pin 11b slides in slot 12a on arm 12'.

Below foot plate 12 is a light spring 13 which tends to force foot plate upwardly, which causes valve 11 to assume its first closed position, Fig. 3. There is also provided below foot plate 12 and surrounding spring 13 a relatively stronger spring 14 adapted to be engaged by the foot plate 12 and compressed after the light spring 13 has been compressed and by a relatively greater force. When the foot plate 12 is pressed downwardly so that only spring 13 is compressed, the valve 11 will be caused to assume the open position, shown in Fig. 5, and when the foot plate is pressed downwardly further so that the stronger spring 14 is also compressed, the valve 11 will be caused to assume its second closed position.

In this modification, horizontal pipe 3' has a bellows or water pressure booster structure 15 which receives water from pipe 3' through an opening 16 in the pipe 3' and bellows structure. A prong 5' depends from pipe 3'; and to provide a temporary more powerful stream of water to blow dirt from an opening 7' in the prongs and to soften hard packed soil, a heavy press or added push of the foot is made.

In normal use, the operator of this tool will press down on the foot pedal 12 only hard enough to compress spring 13 and to turn valve 11 to its open position, but when a temporary powerful stream of water is desired, further pressure will be applied to compress spring 14. This will turn valve 11 to its second closed position and the bellows structure 15 will be compressed so as to force its liquid contents through prong 5' in a powerful stream which will clear opening 7' of any dirt and penetrate the soil more quickly.

As clearly shown in Figs. 3 and 4, the bellows structure 15 is mounted between the foot plate 12 and the horizontal pipe 3' and spring means 14 will constantly urge the foot plate 12 upwardly with the valve 11 in closed position. When however a foot is pressed on the plate 12 to urge it downwardly against the action of the spring 14, the movement of the lever arms 12' and 11a will rotate the valve 11 to open position.

In Fig. 6, there is shown a modified form of the invention wherein a foot plate 21 is supported on a horizontal pipe portion 22 which has a threaded end 23 and prongs 24 depending therefrom. Upon removal of a cap 25, a pipe extension 26 having tubular prongs 27 may be secured to the threaded portion 23 by a coupling 28. The cap 25 will be used to close the other end of the pipe 26 unless further pipes 26 are to be added in which case additional couplings 28 will be used. With all of the prongs 24 and 27 in the ground a larger area can be treated and the tool can be left for a greater time in the ground before becoming clogged.

The tool may be used to supply plain water to the soil or it may be used to supply any other liquid, such as a liquid fertilizer.

While various changes may be made in the detail construction, it shall be understood that such changes shall be within the spirit and scope of the present invention as defined by the appended claims.

What is claimed is:

1. A garden watering tool comprising a handle pipe having means for connecting a water supply hose thereto and having a horizontal portion, a soil penetrating watering prong on the lower end of said handle pipe means and connected to the horizontal portion, a control valve lying in the pipe means, a bellows structure mounted on the horizontal portion of the handle pipe, a foot pressure plate adjustably mounted upon said bellows structure and used to force the prong into the soil, spring means between the foot plate and the horizontal portion of the handle pipe for normally urging said foot plate toward its elevated position, said foot plate connected to the valve to operate the same between its closed and open position whereby as the foot pressure is automatically applied to the foot plate the water will be supplied to the prong.

2. A garden watering tool comprising a handle pipe having means for connecting a water supply hose thereto having a horizontal portion, a soil penetrating watering prong on the lower end of the handle pipe and connected to the horizontal portion, a control valve in the handle pipe and having open and closed positions, a water pressure booster structure communicating with said watering prongs, a bellows structure mounted on the handle pipe, a foot plate mounted on the bellows structure and connected to the booster structure to press the same and the prong into the soil, said foot plate being connected to the valve to adjust the valve between the open and closed positions and automatically close off the water supply to the prong from the pipe whereby water collected in the booster may be forced under high pressure to clear the prong of dirt that may be clogging the same, and spring means between the foot plate and the horizontal portion of the handle pipe for normally urging said foot plate towards its elevated position.

References Cited in the file of this patent

UNITED STATES PATENTS

| 1,934,080 | Meyer | Nov. 7, 1933 |
| 2,018,003 | Axtell | Oct. 22, 1935 |
| 2,214,083 | Lester | Sept. 10, 1940 |